(12) United States Patent
Kim et al.

(10) Patent No.: US 11,789,550 B2
(45) Date of Patent: Oct. 17, 2023

(54) ELECTRONIC PEN FOR LIMITING PEN PRESSURE AND METHOD THEREOF

(71) Applicant: Samsung Electronics Co., Ltd., Suwon-si (KR)

(72) Inventors: Yongmin Kim, Suwon-si (KR); Juwan Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/870,361

(22) Filed: Jul. 21, 2022

(65) Prior Publication Data

US 2023/0029007 A1 Jan. 26, 2023

(30) Foreign Application Priority Data

Jul. 23, 2021 (KR) ........................ 10-2021-0097377

(51) Int. Cl.
*G06F 3/0354* (2013.01)
*G06F 3/041* (2006.01)

(52) U.S. Cl.
CPC ........ *G06F 3/03545* (2013.01); *G06F 3/0414* (2013.01)

(58) Field of Classification Search
CPC .. G06F 3/03545; G06F 3/04162; G06F 3/041; G06F 3/0383; G06F 2203/0384
See application file for complete search history.

(56) References Cited

U.S. PATENT DOCUMENTS

| 6,072,474 A * | 6/2000 | Morimura | ............. G06F 3/0488 |
| | | | 345/179 |
| 2016/0239112 A1 | 8/2016 | Ballan et al. | |
| 2018/0314351 A1* | 11/2018 | Kaneda | ............... G06F 3/03545 |
| 2021/0034101 A1* | 2/2021 | Yildiz | ................. G06F 3/03545 |

FOREIGN PATENT DOCUMENTS

| JP | 5410789 B2 | 2/2014 |
| KR | 10-1293395 B1 | 8/2013 |
| KR | 10-2016-0100903 A | 8/2016 |

* cited by examiner

*Primary Examiner* — Temesghen Ghebretinsae
*Assistant Examiner* — Ivelisse Martinez Quiles
(74) *Attorney, Agent, or Firm* — Jefferson IP Law, LLP

(57) ABSTRACT

An electronic device is provided. The electronic device includes a housing, a nib which is disposed in the housing, includes a pen tip protruding to the outside through the second end, and includes a dielectric coil wound multiple times therein, a printed circuit board electrically connected to the dielectric coil, a board seating part which is at least partially coupled to the nib and in which a printed circuit board is seated, an elastic member seating part disposed in the housing such that the elastic member seating part and the board seating part are at least partially fitted to each other, and an elastic member disposed between the elastic member seating part and the board seating part, when the nib is pressed in a direction toward the inside of the housing by the pen pressure, the pen pressure is transmitted to the elastic member via the board seating part.

11 Claims, 11 Drawing Sheets

ELECTRONIC PEN FOR LIMITING PEN PRESSURE AND METHOD THEREOF

CROSS-REFERENCE TO RELATED APPLICATION(S)

This application is based on and claims priority under 35 U.S.C. § 119(a) of a Korean patent application number 10-2021-0097377, filed on Jul. 23, 2021, in the Korean Intellectual Property Office, the disclosure of which is incorporated by reference herein in its entirety.

TECHNICAL FIELD

The disclosure relates to an electronic device. More particularly, the disclosure relates to an electronic device including a structure capable of limiting the magnitude of pen pressure during handwriting, and a method for limiting the pen pressure by the electronic device.

BACKGROUND ART

Recently, pen-type electronic devices such as styluses (hereinafter, referred to as electronic pens) have been provided as input means such that handwriting inputs can be made on display panels of electronic devices such as digitizers, tablet personal computers (PCs), and smartphones. Electronic pens largely use an electro-magnetic resonance (EMR) scheme in which resonance caused by electromagnetic induction is used, or an active electrostatic scheme (AES).

Portable electronic devices (for example, digitizers, tablet PCs, smartphones) have recently evolved from unilaterally quadrangular shapes to diversified shapes to satisfy user demands for portability, aesthetic appearances, and large screens. To this end, a portable electronic device may include a deformable structure such that the area of the display can be expanded and reduced. A portable electronic device may have a structure of a foldable, slidable, and/or rollable type by using a flexible display.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

A portable electronic device of a foldable, slidable, or rollable type may include a flexible display on at least a part of the display thereof. The flexible display may have a surface made of a flexible material, and the surface may have a lower level of hardness than conventional display surfaces and may be vulnerable to damages. There is a possibility that, when an electronic pen is used to make handwriting inputs on the flexible display, collision or friction with the end of the electronic pen (for example, pen tip) will damage the display surface.

Aspects of the disclosure are to address at least the above-mentioned problems and/or disadvantages and to provide at least the advantages described below. Accordingly, an aspect of the disclosure is to provide an electronic device including a structure capable of limiting the magnitude of pen pressure during handwriting, and a method for limiting the pen pressure by the electronic device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a housing including a first end disposed on one end thereof and a second end disposed on the other end thereof opposite to the first end, a nib which is disposed in the housing, includes a pen tip protruding to the outside through the second end, and includes a dielectric coil wound multiple times therein, a printed circuit board electrically connected to the dielectric coil, a board seating part which is at least partially coupled to the nib and in which a printed circuit board is seated, an elastic member seating part disposed in the housing such that the elastic member seating part and the board seating part are at least partially fitted to each other, and an elastic member disposed between the elastic member seating part and the board seating part, wherein the nib, the board seating part, the elastic member, and the elastic member seating part are sequentially arranged in the housing, wherein when the nib is pressed in a direction toward the inside of the housing by a pen pressure, the pen pressure is transmitted to the elastic member via the board seating part, and the nib and the board seating part move in a first direction from the second end toward the first end as the elastic member is compressed by the pen pressure, and wherein when the pressure is released, the nib and the board seating part are returned in a second direction opposite to the first direction by restoring force of the compressed elastic member.

In accordance with another aspect of the disclosure, a method for limiting a pen pressure of a user by a pen-type electronic device is provided. The electronic device includes a housing, a nib disposed in the housing and including a pen tip at least a partial area of which protrudes to the outside, a board seating part at least partially coupled to the nib, an elastic member seating part disposed such that the elastic member seating part and the board seating part are at least partially fitted to each other, and an elastic member disposed between the elastic member seating part and the board seating part, when the nib is pressed in a direction toward the inside of the housing by a pen pressure, the board seating part may be disposed to compress the elastic member while moving in a direction toward the elastic member seating part, and the method may include sensing whether the maximum pen pressure is exceeded, and controlling, based on whether the maximum pen pressure is exceeded, the output module to output the signal.

Advantageous Effects of Invention

According to various embodiments, display damage may be prevented by a structure configured to limit a pen pressure when an electronic device for handwriting input is pressured by a pressure larger than a predetermined pen pressure. According to various embodiments, when a pen pressure applied by an electronic device for handwriting input is larger than a predetermined threshold value, the user may be notified thereof and guided to apply only an appropriate pen pressure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

Figure 1:
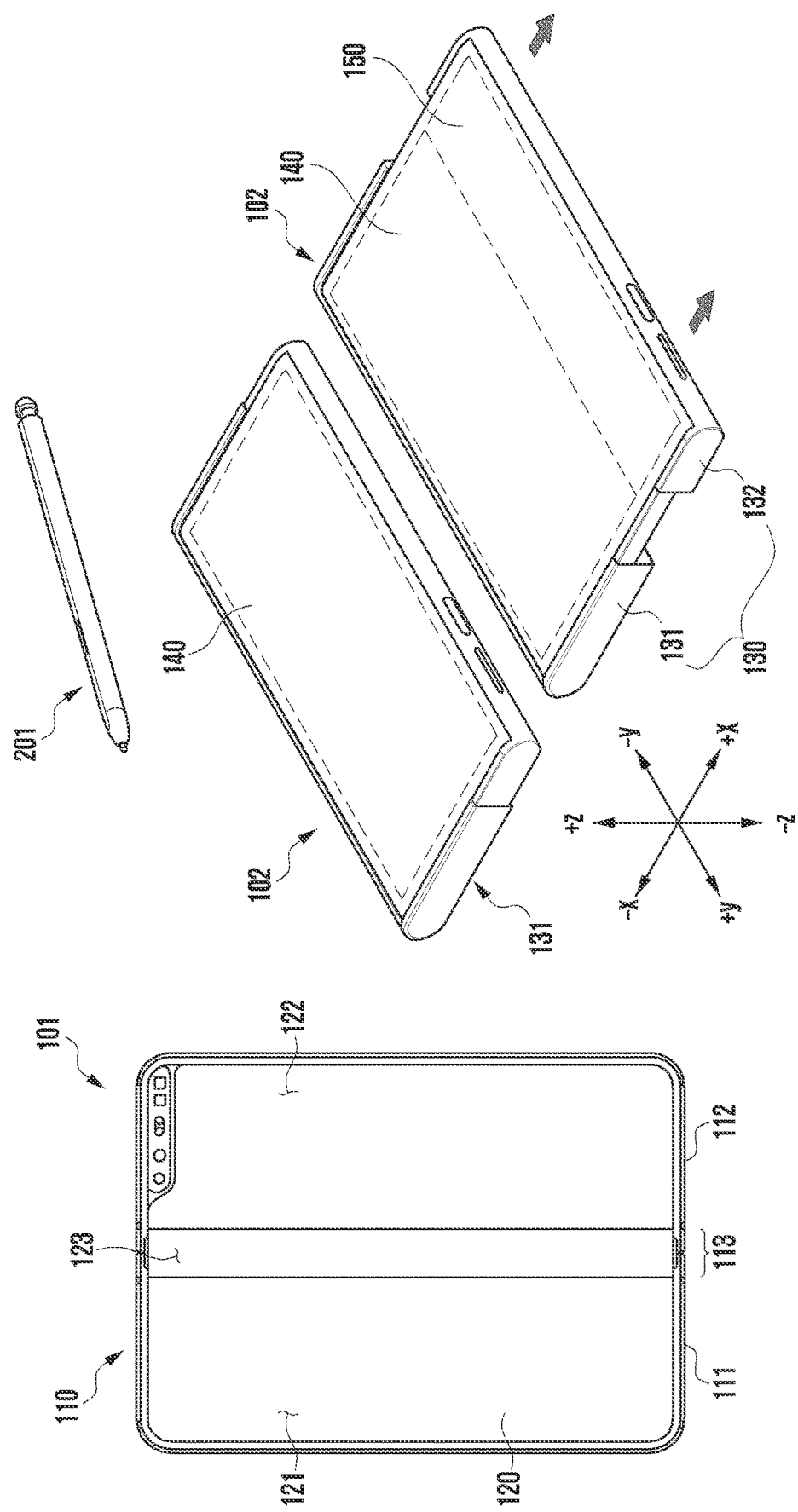
FIG. 1 illustrates an external device and an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In connection with the description of the drawings, similar or related components may be denoted by similar reference numerals. The singular form of a noun corresponding to an item may include one or more of the items unless the relevant context clearly indicates otherwise.

As used herein, "A or B," "at least one of A and B," "at least one of A or B," "A, B, or C," "at least one of A, B, and C," and "at least one of A, B, or C" each may include any one of, or all possible combinations of, items listed together in the corresponding one of the phrases. Terms such as "first," "second," or "first" or "second" may be used simply to distinguish the element from the other elements, and the elements are not limited in other aspects (e.g., importance or order). When it is said that one (e.g., first) element is "coupled" or "connected" to another (e.g., second) component, with or without the terms "functionally" or "communicatively," it means that the one element can be connected to the other element directly (e.g., by wire), wirelessly, or through a third element.

FIG. 1 illustrates an external device and an electronic device according to an embodiment of the disclosure.

Referring to FIG. 1, an electronic device 201 may perform user handwriting input on a display 120, 140, and/or 150 of an external device (e.g., a foldable external device 101 and/or a rollable external device 102). The electronic device 201 may input a handwriting input to the external device 101 or 102 in direct contact with or in a state (e.g., hovering input) of being spaced a predetermined distance or less apart from the display 120, 140, and/or 150 of the external device 101 or 102. According to various embodiments, the electronic device 201 may include at least one of a coil, an inductor, or a capacitor. The electronic device 201 may use the coil, inductor, and/or capacitor to generate a signal including a resonance frequency. For example, in order to generate signal, the electronic device 201 may use at least one of an electro-magnetic resonance (EMR) method, an active electrostatic scheme (AES) method, or an electrically coupled resonance (ECR) method. When the electronic device 201 transmits a signal by using the EMR method, the electronic device 201 may generate a signal including a resonance frequency, based on an electromagnetic field generated by an inductive panel of the external device 101 and 102. When the electronic device 201 transmits a signal by using the AES method, the electronic device 201 may generate a signal by using capacity-coupling with the external devices 101 and 102. When the electronic device 201 transmits a signal by using the ECR method, the electronic device 201 may generate a signal including a resonance frequency, based on an electric field generated by a capacitive device of an electronic device. According to an embodiment, the electronic device 201 may change the intensity or frequency of an electromagnetic field according to a manipulation state of a user. For example, the electronic device 201 may provide a frequency for recognizing a hovering input, a drawing input, a button input, or an erasing input.

Referring to FIG. 1, the external device 101 and 102 may include a shape (e.g., a foldable external device 101) in which a display can be folded or unfolded and/or a shape (e.g., a rollable external device 102) in which a display can be rolled or unrolled.

Referring to FIG. 1, the foldable external device 101 may include a pair of housings 111 and 112 (e.g., a foldable housing structure) rotatably coupled via a hinge 113 to be folded with respect to each other, and a display 120 (e.g., a flexible display or a foldable display) disposed in a space formed by the pair of housings 111 and 112.

In an embodiment, the pair of housings 111 and 112 may include a first housing 111 and a second housing 112. According to an embodiment, the first housing 111 and the second housing 112 may have an overall symmetrical shape. According to an embodiment, the angle or distance between the first housing 111 and the second housing 112 may vary depending on whether the foldable external device 101 is in an unfolded state (flat stage or unfolding state), a folded state (folding state), or an intermediate state.

In an embodiment, the foldable external device 101 may operate in an in-folding manner and/or an out-folding manner by the operation in which the first housing 111 rotates in a range of 0 to 360 degrees with respect to the second housing 112 via the hinge 113. According to various embodiments, the hinge 113 may be configured in a vertical direction or a horizontal direction when the foldable external device 101 is viewed from above. According to various embodiments, there may be the plurality of hinges 113. For example, all of the plurality of hinges may be arranged in the same direction. In another example, a part of the plurality of hinges may be arranged and folded in different directions.

According to an embodiment, at least a part of the first housing 111 and the second housing 112 may be made of a metal material or a non-metal material having the rigidity of a level selected to support the display 120.

In an embodiment, the first housing 111 and the second housing 112 may provide, through an intercoupled structure, a space in which various components (for example, printed circuit board, antenna module, sensor module, or battery) of the foldable external device 101 can be disposed.

The display 120 may be disposed on a space formed by the pair of housings 111 and 112. For example, the display 120 may be disposed to substantially occupy most of the front surface of the foldable external device 110. In an embodiment, the display 120 may mean a display in which at least a partial area thereof may be transformed into a flat or curved surface. In an embodiment, the display 120 may include a first display 121 disposed in a first housing 111 and a second display disposed in a second housing 112. According to an embodiment, the display 120 may include a flexible display in at least a partial area thereof. For example, a portion corresponding to an area (e.g., a folding area 123) between the first display 121 and the second display 122 may include at least a flexible display. According to an embodiment, the folding area 123 of the display 120 may change the form thereof according to the change to the folded or unfolded state of the foldable external device 101.

Referring to FIG. 1, the rollable external device 102 according to various embodiments may include a first housing 131 and a second housing 132. According to an embodiment, the second housing 132 may move from the first housing 131 in a designated direction, for example, a first direction (a +X direction). For example, the second housing 132 may slide from the first housing 131 in the first direction (the +X direction) by a designated distance. According to an embodiment, the second housing 132 may reciprocate from a portion of the first housing 131 in the first direction (the +X direction) in a range within a designated distance.

In various embodiments disclosed herein, a state in which the second housing 132 has slid from the first housing 131 in the first direction (the +X direction) may be defined as a second state (e.g., an extended state, or a slide-out state) of the rollable external device 102. In various embodiments disclosed herein, the second state of the rollable external device 102 may be defined as a state in which a second portion (e.g., display 150) is visually exposed to the outside. According to an embodiment, the second housing 132 may move from the first housing 131 in the first direction (the +X direction) so that at least a portion of the second housing and/or the second portion (e.g., display 150) is drawn out, and may reciprocate according to withdrawing or winding.

In various embodiments disclosed herein, a state in which the second housing 132 has slid in a direction toward the first housing 131, for example, a second direction (a −X direction) opposite to the first direction (the +X direction) may be defined as a first state (e.g., a contracted state or a slide-in state) of the rollable external device 102. In various embodiments disclosed herein, the first state of the rollable external device 102 may be defined as a state in which the second portion (e.g., display 150) is visually exposed to the outside.

In various embodiments, the first state may be referred to as a first form and the second state may be referred to as a second form. For example, the first form may include a normal state, a contracted state, or a closed state, and the second form may include an open state. In an embodiment, the rollable external device 102 may form a third state (e.g., an intermediate state) which is a state between the first state and the second state. For example, the third state may be referred to as a third form, and the third form may include a free-stop state.

According to an embodiment, the rollable external device 102 may be referred to as a "slidable electronic device" as the second housing 132 is designed to slide and may be referred to as a "rollable electronic device" as at least a portion of the display 140 and 150 is designed to be wound in the second housing 132 (or the first housing 131), based on the sliding movement of the second housing 132.

According to an embodiment, in the rollable external device 102, the second housing 132 may be coupled to be at least partially slidable from the first housing 131. According to an embodiment, the coupling shape of the first housing 131 and the second housing 132 is not limited to the shape and coupling illustrated in FIG. 1, and may be implemented by the coupling and/or combination of other shapes or components.

According to an embodiment, the display 140 and 150 may be disposed to be visually exposed to the outside via the front direction (e.g., a +Z direction) of each of the first housing 131 and the second housing 132. According to an embodiment, a display area of the display 140 and 150 may be defined to include a first part (e.g., display 140).

According to an embodiment, the first part (e.g., display 140) may be a display area fixedly and visually exposed to the outside regardless of whether the rollable external device 102 is in the second state or the first state. For example, the first part (e.g., display 140) may be fixed without movement regardless of the sliding movement of the second housing 132.

According to an embodiment, the second part (e.g., display 150), which is a display area extending from one end of the first part (e.g., display 140), may be drawn into an inner space of the second housing 132 or may be drawn out from the inner space of the second housing 132 to the outside in association with the sliding movement of the second housing 132. According to an embodiment, a hole (not illustrated) which the second part (e.g., display 150) is drawn out of or into may be disposed adjacent to a +X direction-side surface of the second housing 132. For example, the second part (e.g., display 150) may be drawn into or out of a +X direction-boundary part of the second housing 132.

According to an embodiment, in the second state, the second part (e.g., display 150) may be drawn out from the inner space of the second housing 132 to the outside to be visually exposed to the outside. According to an embodiment, in the first state, the second part (e.g., display 150) may be drawn into the inner space of the second housing 132 not to be visually exposed to the outside.

According to an embodiment, the display 140 and 150 may include a flexible display at least a partial area thereof. According to an embodiment, the second part (e.g., display 150) may include a flexible display. The second part (e.g., display 150) may be drawn into the inner space of the second housing 132 while being rolled and bent thereinto in the first state.

According to an embodiment, with respect to a display area of the display 140 and 150 in the first state, only the first part (e.g., display 140) and display 150 may be visually exposed to the outside.

According to an embodiment, with respect to a display area of the display 140 and 150 in the second state, the first part (e.g., display 140) and the second part (e.g., display 150) may be visually exposed to the outside.

Figure 2:
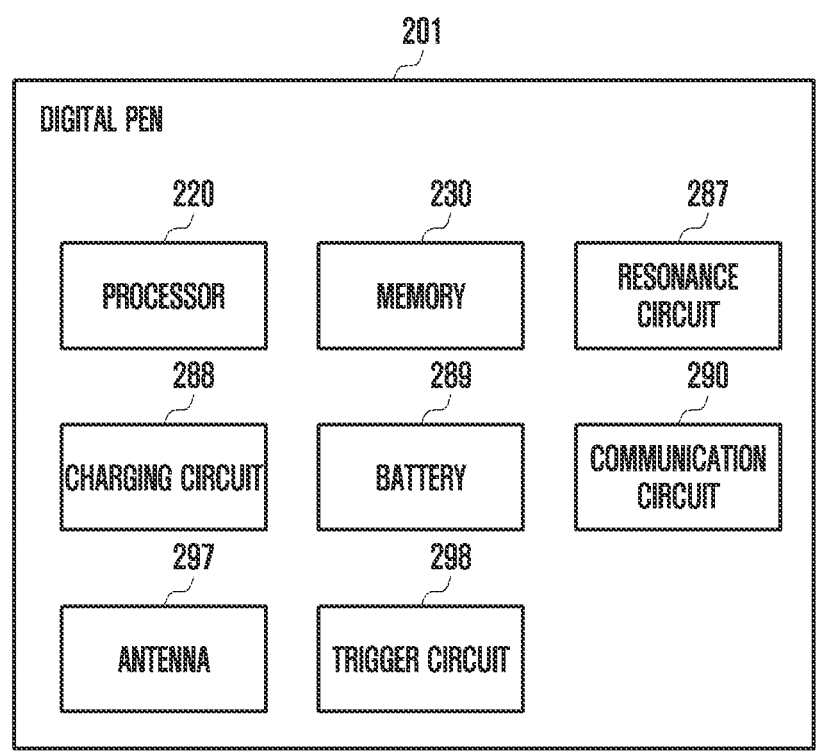
FIG. 2 is a block diagram of an electronic device according to an embodiment of the disclosure.

FIG. 2 is a block diagram of an electronic device according to an embodiment of the disclosure.

Referring to FIG. 2, an electronic device 201 according to an embodiment may include a processor 220, a memory 230, a resonance circuit 287, a charging circuit 288, a battery 289, a communication circuit 290, an antenna 297, and/or a trigger circuit 298. In one embodiment, the processor 220, at least a part of the resonance circuit 287, and/or at least a part of the communication circuit 290 of the electronic device 201 may be configured on a printed circuit board or in the shape of a chip. The processor 220, the resonance circuit 287, and/or the communication circuit 290 may be electrically connected to the memory 230, the charging circuit 288, the battery 289, the antenna 297, or the trigger circuit 298. The electronic device 201 according to an embodiment may be only configured with a resonance circuit and a button.

The processor 220 may include a generic processor configured to execute software (for example, an application program) or a customized hardware module. The processor may include a software element (program) or a hardware component (function) including at least one of a communication module, a module managing the state or environment of the electronic device 201, an input/output interface, a data measurement module, or various sensors provided in the electronic device 201. The processor 220 may include, for example, one of, or a combination of two or more of, hardware, software, a firmware. According to an embodiment, the processor 220 may receive a proximity signal corresponding to an electromagnetic signal generated by the external device (e.g., external devices 101 and 102 in FIG. 1) via the resonance circuit 287. When the proximity signal is identified, the resonance circuit 287 may be controlled to transmit an electro-magnetic resonance (EMR) input signal to the external device 101 and 102.

The memory 230 may store information related to the operation of the electronic device 201. For example, the information may include information for communication with the external device 101 and 102 and frequency information related to an input operation of the electronic device 201.

The resonance circuit 287 may include at least one of a coil, an inductor, or a capacitor. The resonance circuit 287 may be used to allow the electronic device 201 to generate a signal including a resonance frequency. For example, in order to generate a signal, the electronic device 201 may use at least one of an electro-magnetic resonance (EMR) method, an active electrostatic scheme (AES) method, or electrically coupled resonance (ECR) method. When the electronic device 201 transmits a signal by using the EMR method, the electronic device 201 may generate a signal including a resonance frequency, based on an electromagnetic field generated by an inductive panel of the external device 101 and 102. When the electronic device 201 transmits a signal by using the AES method, the electronic device 201 may generate a signal by using the capacity-coupling with the external device 101 and 102. When the electronic device 201 transmits a signal by using the ECR method, the electronic device 201 may generate a signal including a resonance frequency, based on the electric field generated by the capacitive device of the electronic device. According to an embodiment, the resonance circuit 287 may be used for changing the intensity or frequency of the electromagnetic field according to the manipulation state of a user. For example, the resonance circuit 287 may provide a frequency for recognizing a hovering input, a drawing input, a button input, or an erasing input.

The battery 289 may be configured to store power required for the operation of the electronic device 201. The battery may include, for example, a lithium-ion battery or a capacitor and may be a rechargeable type or a replaceable type. According to an embodiment, the battery 289 may be charged by using the power (for example, a direct current signal (a direct current power)) provided from the charging circuit 288.

The communication circuit 290 may be configured to perform a wireless communication function of the electronic device 201 and the external device 101 and 102. According to an embodiment, the communication circuit 290 may transmit the status information and input information of the electronic device 201 to the external device 101 and 102 by using the near-field communication method. For example, the communication circuit 290 may transmit residual quantity information of the battery 289, voice information input via a microphone, or directional information (e.g., a motion sensor data) of the electronic device 201 acquired via the trigger circuit 298 to the external device 101 and 102. In an example, the near-field communication method may include at least one of Bluetooth, Bluetooth low energy (BLE), or a wireless local area network (LAN).

The antenna 297 may be used to transmit or receive a signal or power to or from the outside (for example, the external device 101 and 102). According to an embodiment, the electronic device 201 may include a plurality of antennas 297. Among these, at least one antenna 297 suitable for the communication may be selected. Via at least one selected antenna 297, the communication circuit 290 may exchange a signal or power with the external electronic device.

The trigger circuit 298 may include at least one button or a sensor circuit. According to an embodiment, the processor 220 may identify the input method (for example, touch or press) or type (for example, an EMR button or a BLE button) of the button of the electronic device 201. According to an embodiment, the sensor circuit may generate a data value or an electric signal corresponding to the external environmental state or the internal operational state of the electronic device 201. For example, the sensor circuit may include at least one of a motion sensor, a battery residual quantity detection sensor, a pressure sensor, an optical sensor, a temperature sensor, a geomagnetic sensor, and a biometric sensor. According to an embodiment, the trigger circuit 298 may transmit a trigger signal to the external device 101 and 102 by using a button input signal or a signal via a sensor.

Figure 3:
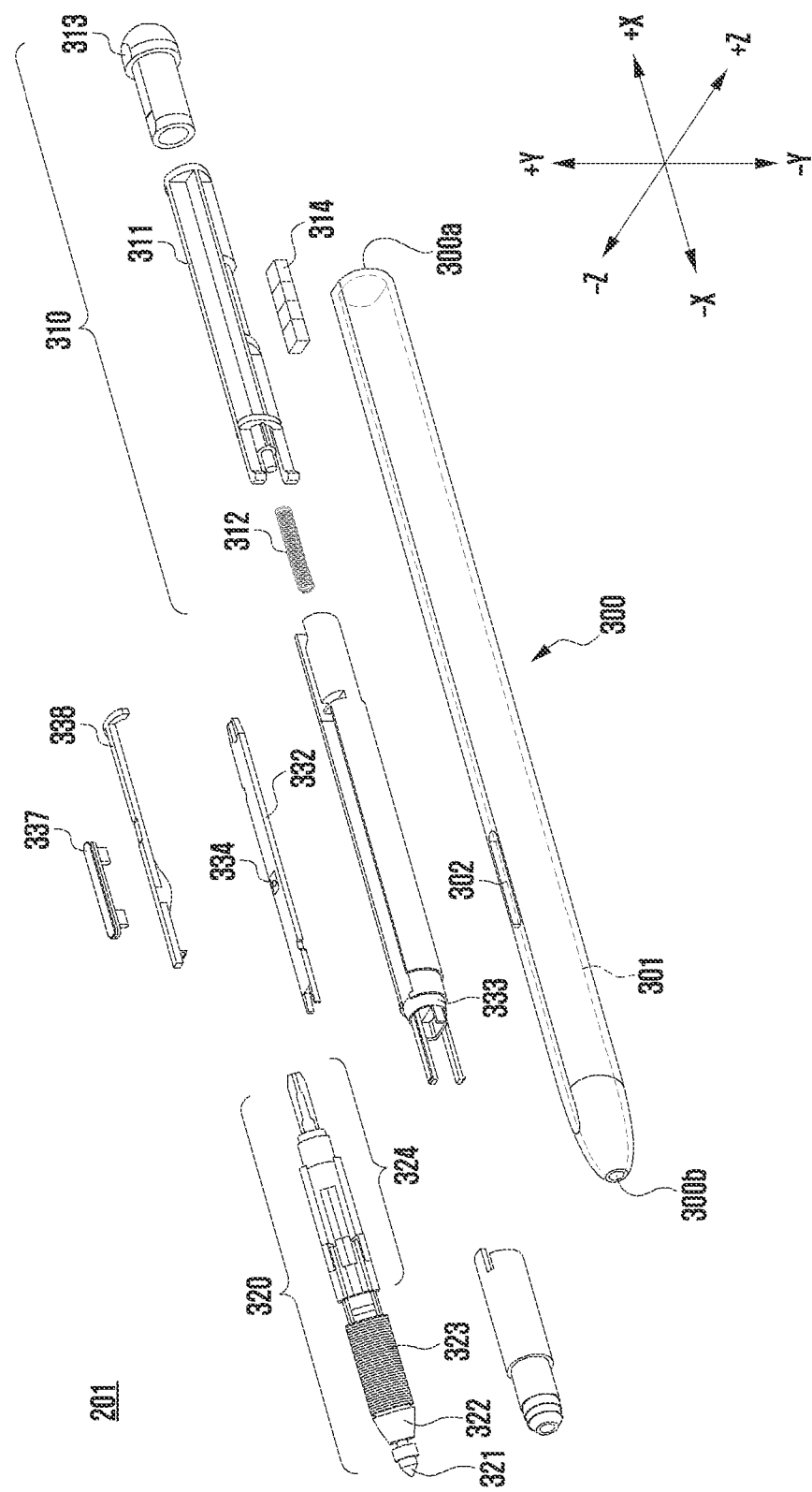
FIG. 3 is an exploded perspective view of an electronic device according to an embodiment of the disclosure.

FIG. 3 is an exploded perspective view of an electronic device according to an embodiment of the disclosure.

Referring to FIG. 3, an electronic device 201 may include a pen housing 300 defining an outer shape of the electronic device 201 and an inner assembly inside the pen housing 300. In the illustrated embodiment, the inner assembly may include all the various components mounted in a pen and may be inserted in the pen housing 300 by means of a single assembling operation.

The pen housing 300 may have a shape extending to be long between a first end 300a and a second end 300b and may include an accommodation space 301 therein. The pen housing 300 may have an elliptical cross-section including a long axis and a short axis, and may have an elliptic cylinder shape as a whole. The accommodation space 301 of the electronic device 201 may also have an elliptical cross-section corresponding to the shape of the pen housing 300. The pen housing 300 may include a synthetic resin (e.g., plastic) and/or a metallic material (e.g., aluminum). According to an embodiment, the second end 300b of the pen housing 300 may be made of a synthetic resin material.

The inner assembly may have a shape extending to be long, corresponding to the shape of the pen housing 300. The inner assembly may be largely divided into three configurations along a longitudinal direction. For example, the inner assembly may include a support unit 310 disposed at a position corresponding to the first end 300a of the pen housing 300, a nib 320 disposed at a position corresponding to the second end 300b of the pen housing 300, a circuit board unit 330 disposed at a position corresponding to a body of a housing.

The support unit 310 may include a configuration for supporting the nib 320 and the circuit board unit 330 in a −X-axis direction in the pen housing 300. According to an embodiment, the support unit 310 may include an elastic member seating part 311, an elastic member 312 which is seated in at least a partial area of the elastic member seating part 311 and has an elastic force, a rear cap 313 which supports the elastic member seating part 311 in a direction from the first end 300a and at least a part of which protrudes to the outside the pen housing 300 through the first end 300a, and a magnetic member 314 which is seated in a partial area of the elastic member seating part 311 and has magnetic properties. According to an embodiment, the elastic member 312, the elastic member seating part 311, and the rear cap 313 may be arranged in a row inside the pen housing 300. According to an embodiment, the elastic member 312 may include a structure having an elastic force such as a spiral spring and a plate spring. According to an embodiment, the elastic member 312 may be arranged and coupled to fit with at least a part of the elastic member seating part 311. According to an embodiment, the magnetic member 314 may emit a magnetic field and may include a multipolar magnet whose direction of polarity is not deflected. The direction of the polarity of the magnetic member 314, which is not deflected, may mean, for example, a direction of polarity which is emitted around an X-axis. According to an embodiment, the magnetic member 314 may include a structure in which a plurality of dipole magnets are coupled in different polar directions.

The nib 320 may include a pen tip 321 which is exposed to the outside the second end 300b when the inner assembly is completely inserted into the pen housing 300, a packing ring 322, a coil 323 wound multiple times, and/or a pen pressure sensing unit 324 for obtaining the change in pressure due to the pressing of the pen tip 321. The packing ring 322 may include epoxy, rubber, urethane, or silicone. The packing ring 322 may be provided for the purpose of waterproofing and dustproofing and may protect the nib 320 and the circuit board unit 330 from immersion or dust. According to an embodiment, the coil 323 may form a resonance frequency at a set frequency band (e.g., 500 kHz) and may be combined with at least one element (e.g., capacitor) to adjust a resonance frequency formed by the coil 323 in a predetermined range.

The circuit board unit 330 may include a printed circuit board 332, a board seating part 333 which surrounds at least one surface of the printed circuit board 332, and an antenna. According to an embodiment, the printed circuit board 332 is disposed on an upper surface of the board seating part 333, and the printed circuit board 332 may be fixed while being seated in the board seating part 333. According to an embodiment, the printed circuit board 332 may include an upper surface and a lower surface, a switch 334 or a variable-capacity capacitor connected to the coil 323 may be arranged on the upper surface, and a charging circuit, battery, or a communication circuit may be arranged on the lower surface. The battery may include an electric double-layered capacitor (EDLC). The charging circuit may be positioned between the coil 323 and the battery and include a voltage detector circuitry and a rectifier.

According to various embodiments, the switch 334 may be provided on the printed circuit board 332. A side button 337 provided in the electronic device 201 may be used to press the switch 334 and may be exposed to the outside through a side opening 302 of the pen housing 300. The side button 337 is supported by a support member 338, and when there is no external force acting on the side button 337, the support member 338 can provide an elastic restoring force to restore or maintain the side button 337 to be disposed at a predetermined position.

The circuit board unit 330 may include another packing ring such as an O-ring. For example, an O-ring made of an elastic body may be disposed on opposite ends of the board seating part 333 to provide a sealing structure between the board seating part 333 and the pen housing 300. In one embodiment, the support member 338 may partially come into close contact with an inner wall of the pen housing 300 around the side opening 302 so as to provide a sealing structure. For example, the circuit board unit 330 may also provide waterproof and dustproof structure similar to the packing ring 322 of the nib 320.

The electronic device 201 may include a battery (not illustrated) and a battery seating part (not illustrated) in which the battery is disposed. The battery which can be mounted to the battery seating part may include, for example, a cylinder-type battery.

The electronic device 201 may include a microphone (not illustrated). The microphone may be directly connected to the printed circuit board 332 or may be connected to a separate flexible printed circuit board (FPCB) (not illustrated) connected to the printed circuit board 332. According to various embodiments, the microphone may be disposed at a position parallel to the side button 337 in a longitudinal direction of the electronic device 201.

According to various embodiments, the board seating part 333 and the elastic member seating part 311 may include a structure in which at least parts thereof are fitted to each other, and may be arranged in a state of being spaced a predetermined distance apart from each other or in close contact with each other. According to an embodiment, the elastic member 312 may be disposed in the space formed by fitting at least a part of the board seating part 333 and the elastic member seating part 311. The elastic member 312 may be compressed when pressed in the X direction from the board seating part 333 in a state of being coupled to the elastic member seating part 311 so as to store elastic force, and the board seating part 333 may be pressed in the −X direction by the stored elastic force. The board seating part 333 may be disposed to reciprocate on the X-axis according to the pressure (e.g., pen pressure) transmitted from the nib 320 in a state in which a part of the board seating part is fitted into the elastic member seating part 311.

Figure 4:
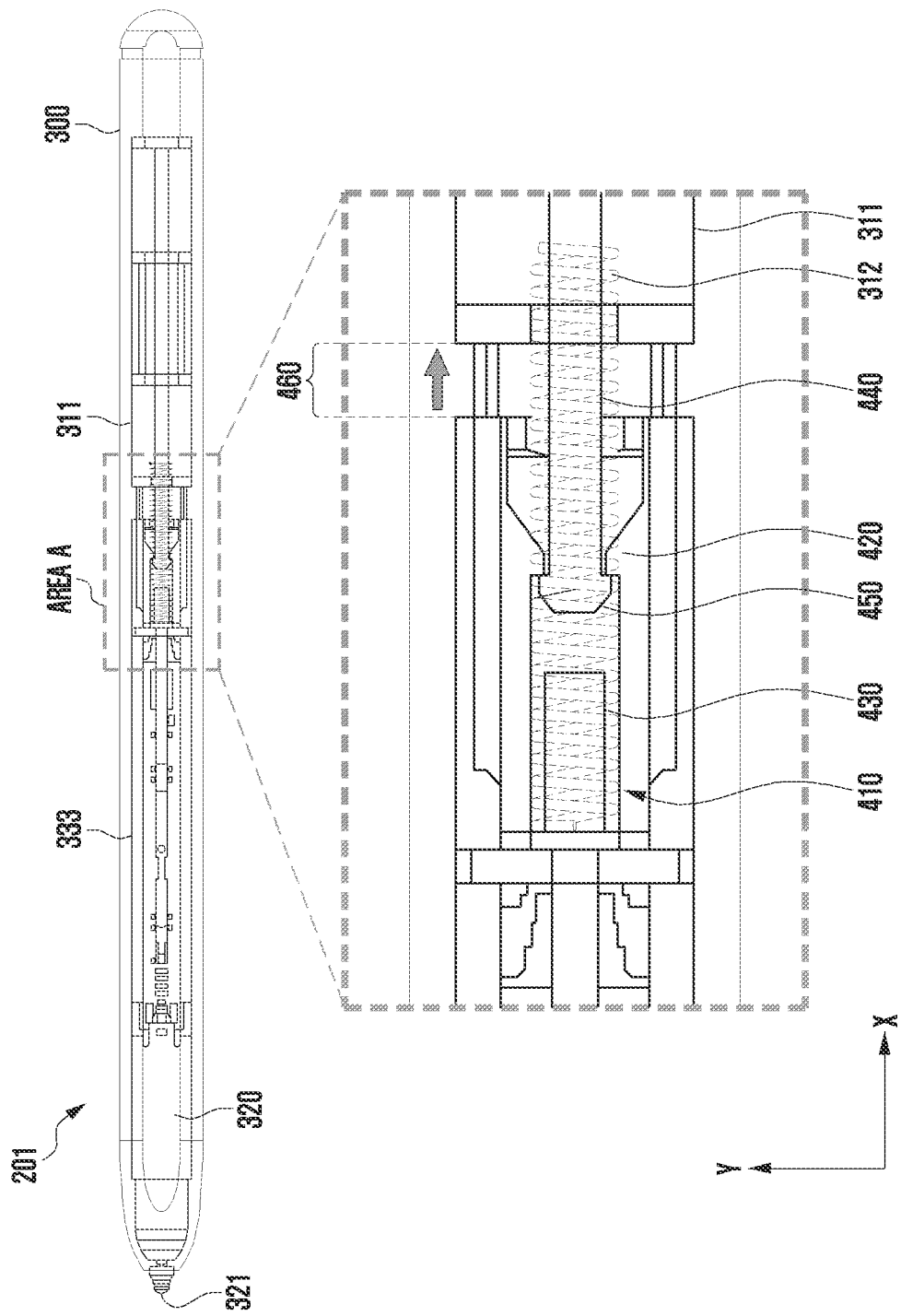
FIGS. 4 and 5 are diagrams illustrating a structure in which an electronic device limits a pen pressure according to various embodiments of the disclosure.
Figure 5:
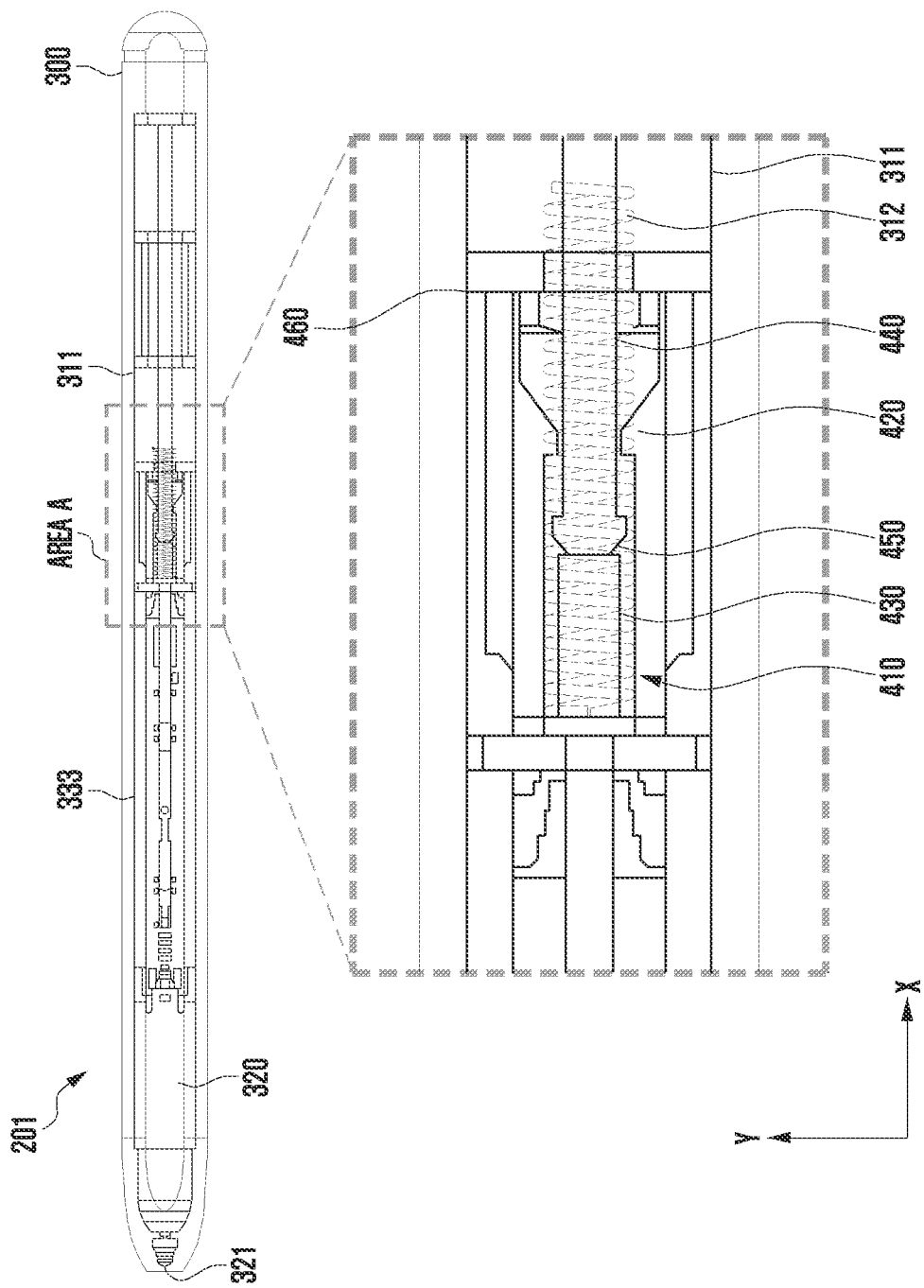

FIGS. 4 and 5 are diagrams illustrating a structure in which an electronic device limits a pen pressure according to various embodiments of the disclosure.

Referring to FIGS. 4 and 5, an inner assembly of a pen housing 300 of an electronic device 201 may have a shape extending to be long corresponding to the shape of the pen housing 300. According to an embodiment, a support unit (e.g., the support unit 310 in FIG. 3), a circuit board unit (e.g., the circuit board unit 330 in FIG. 3), and the nib 320 may be arranged in a row to be at least partially contact with each other in the pen housing 300. According to an embodiment, the nib 320 and the board seating part 333 may be arranged to be at least partially coupled to each other. According to an embodiment, the nib 320 and the board seating part 333 may reciprocate along the X-axis in a state of being connected to each other.

Referring to FIGS. 4 and 5, the board seating part 333 and the elastic member seating part 311 may be coupled to be at least partially fitted to each other. Referring to area A in FIGS. 4 and 5, the board seating part 333 may include a hollow part 410 into which at least a part (e.g., a coupling part 440) of the elastic member seating part 311 and/or the elastic member 312 can be inserted. According to an embodiment, the board seating part 333 and the elastic member seating part 311 may be coupled to each other via the hollow part 410 such that at least parts thereof are fitted to each other. The elastic member seating part 311 may include a coupling part 440 which is disposed in a direction toward the board seating part 333 and at least a part of which is inserted into the hollow part 410. The coupling part 440 may include a protrusion part 450 formed on an end thereof to prevent disengagement, and the hollow part 410 may include a regulation part 420 which protrudes toward the inside of the hollow to prevent the disengagement of the coupling part 440. According to an embodiment, the protrusion part 450 is regulated by the regulation part 420 so that the connection between the board seating part 333 and the elastic member seating part 311 is maintained. The elastic member 312 may be disposed between the board seating part 333 and the elastic member seating part 311. According to an embodiment, the elastic member 312 may be disposed to be inserted into the hollow part 410 in a state of being coupled to at least a partial area of the elastic member seating part 311. According to various embodiments, the board seating part 333 may move in left and right directions (e.g., the X-axis direction). The board seating part 333 may move in the left and right directions in a state of being connected to the elastic member seating part 311 via the coupling part 440. According to an embodiment, the board seating part 333 may move in a left direction (−X direction) to a point at which the protrusion part 450 is regulated by the regulation part 420. According to an embodiment, the board seating part 333 may include the protrusion part 430 protruding in a right direction (X direction) in the hollow part 410. According to an embodiment, the protrusion part 430 may guide the position of the elastic member 312 when the elastic member 312 is inserted into the hollow part 410 of the board seating part 333. Referring to FIGS. 4 and 5, the board seating part 333 and the nib 320 may be connected to each other to integrally move in the X-axis direction or the −X-axis direction. According to an embodiment, the elastic member 312 may be disposed over the hollow part 410 and the coupling part 440, and may be coupled to the elastic member seating part 311 at least a partial area thereof. According to an embodiment, the elastic member 312 may be compressed in the X-axis direction according to the movement of the board seating part 333. The board seating part 333 may press the elastic member 312 while moving in the X-axis direction, and the elastic member 312 may be compressed by the pressure generated by being regulated from the elastic member seating part 311 and pressed by the board seating part 333. The compressed elastic member 312 may store elastic force. The elastic member 312 may press the board seating part 333 in the −X-axis direction by the stored elastic force in a state of being coupled to the elastic member seating part 311 when the pressure from the board seating part 333 is released.

Referring to FIG. 4, at least a part of the nib 320 may protrude to the outside of the pen housing 300. At least a part of the pen tip 321 may protrude to the outside of the pen housing 300 via the second end (e.g., the second end 300b in FIG. 3) when the nib 320 is completely inserted into the pen housing 300. According to an embodiment, the pen tip 321 protruding to the outside may receive the pressure (e.g., the pen pressure) from the outside according to the writing input of a user. For example, the pressure direction may include at least force in an X-axis direction. According to an embodiment, the pen tip 321 which has received the pressure in the X-axis direction by the pen pressure may transfer the pressure to the nib 320 and the board seating part 333 connected to the nib 320. The board seating part 333 may transfer the received pressure to the elastic member 312. According to an embodiment, the board seating part 333 may move in the X-axis direction by the pen pressure within the range of a gap 460 provided between the board seating part 333 and the elastic member seating part 311.

Referring to FIG. 5, the nib 320 and the board seating part 333 may integrally move in the X-axis direction by the pen pressure transferred by the pen tip 321. FIG. 5 may be a view illustrating that the board seating part 333 has been moved in the X-axis direction as much as possible by the pen pressure. That is, FIG. 5 may be a view illustrating that the elastic member 312 has been compressed as much as possible. The board seating part 333 may move in the X-axis direction until the gap 460 between the board seating part 333 and the elastic member seating part 311 is removed. The board seating part 333 may move in the X-axis direction until the protrusion part (e.g., the protrusion part in FIG. 4) comes into contact with the coupling part 440. According to an embodiment, the maximum length of the gap 460 may be at least identical to or greater than the length by which the pen tip 321 protrudes to the outside of the pen housing 300. According to an embodiment, when the elastic member 312 is maximally compressed, the pen tip 321 may be completely inserted into the pen housing 300. According to another embodiment, when the elastic member 312 is maximally compressed, at least a part of the pen tip 321 is inserted into the pen housing 300, and the other part thereof may protrude to the outside of the pen housing 300. According to an embodiment, the pen tip 321 may protrude to the outside of the pen housing 300 only under the pen pressure within a predetermined range. For example, when the elastic member 312 is maximally compressed, the elastic force may be smaller than a threshold pressure in which a flexible display of an external device (e.g., external devices 101 and 102 in FIG. 1) is damaged.

Figure 6:
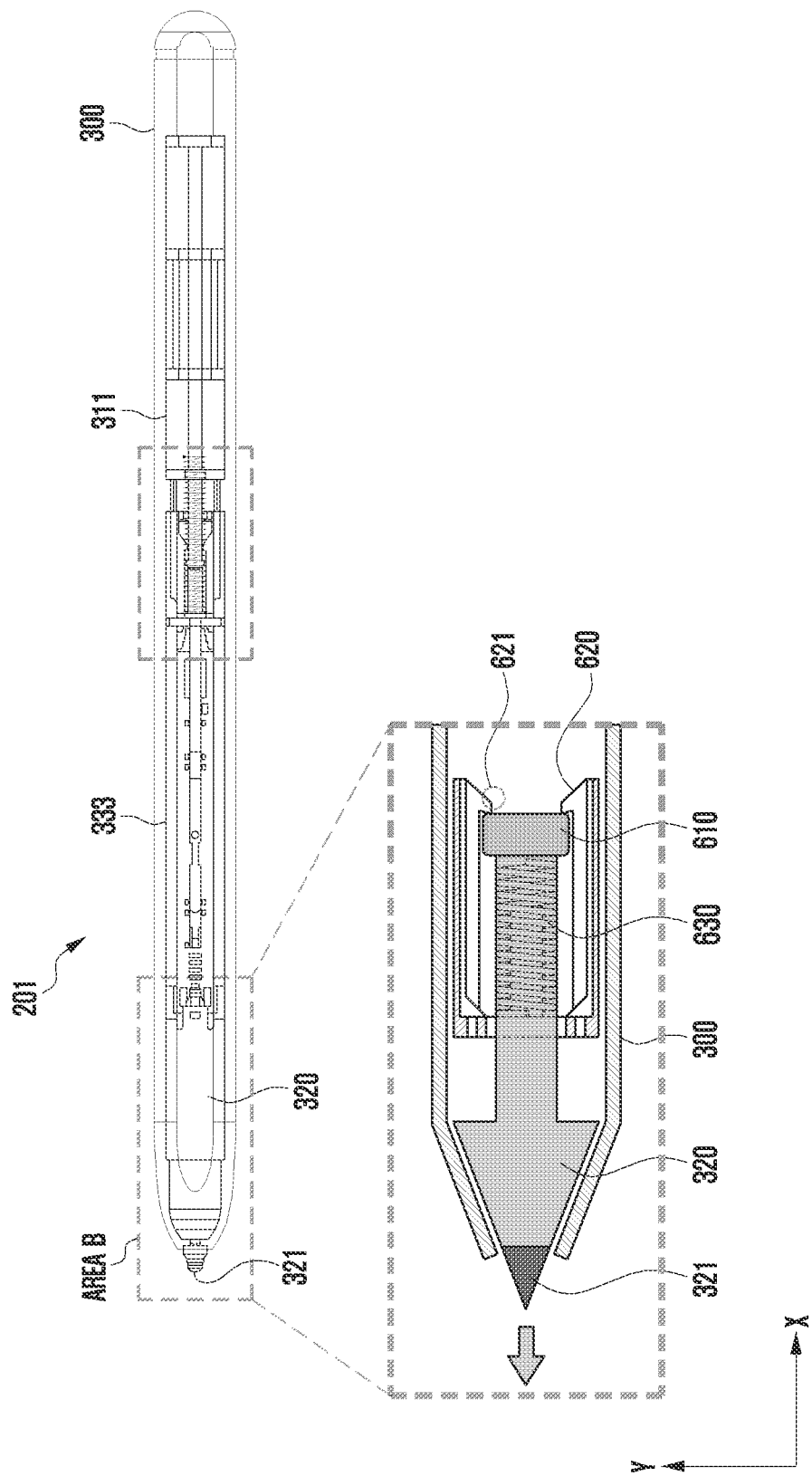
FIGS. 6 and 7 are diagrams illustrating a structure in which an electronic device limits a pen pressure according to various embodiments of the disclosure.
Figure 7:
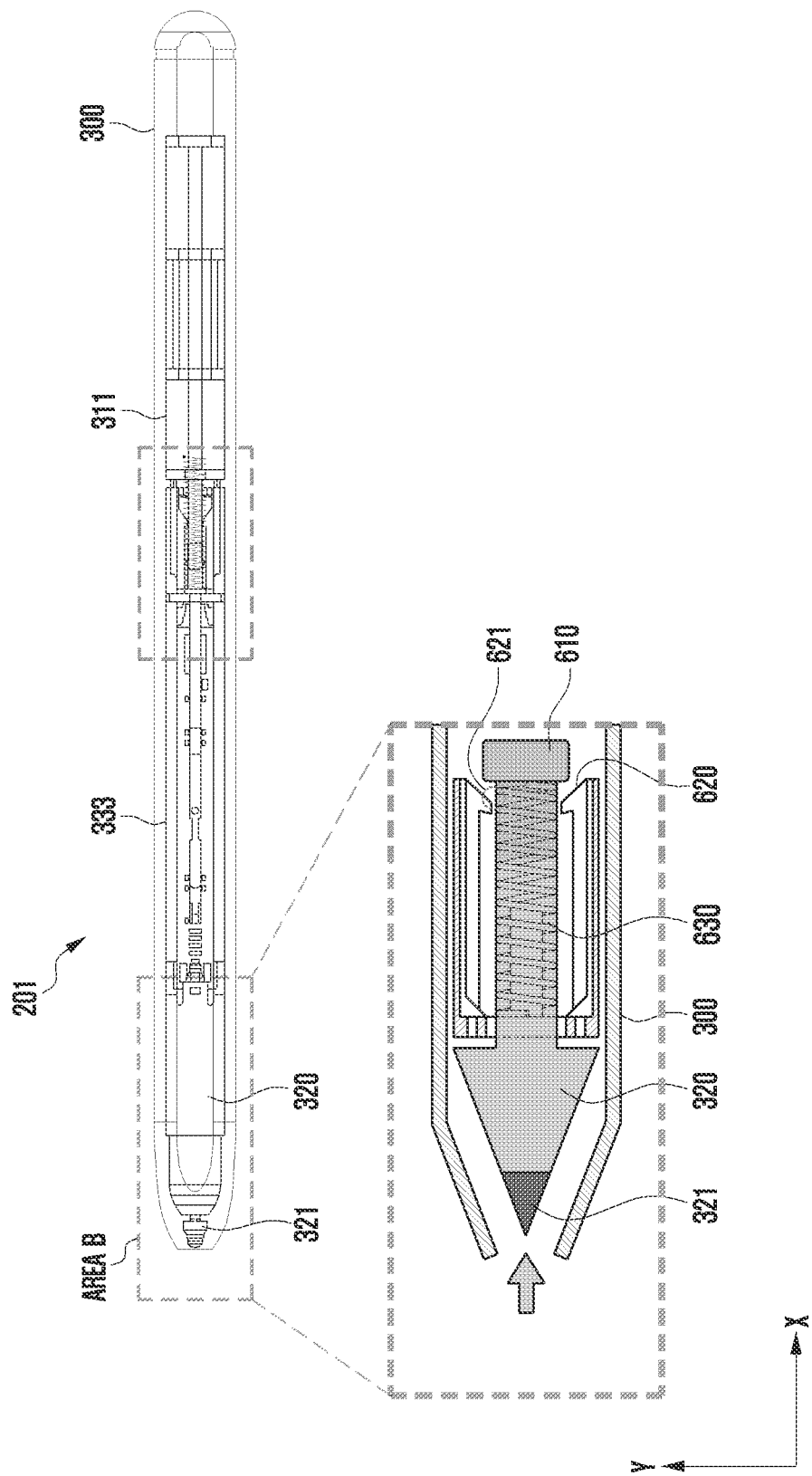

FIGS. 6 and 7 are diagrams illustrating a structure in which an electronic device limits a pen pressure according to various embodiments of the disclosure.

Referring to FIGS. 6 and 7, an electronic device 201 may include a structure (e.g., area B) of limiting the pen pressure in at least a part of a pen housing 300 and a nib 320. According to an embodiment, the nib 320 may include a shaft 630 provided in a direction (e.g., the X-axis direction) toward a first end (e.g., the first end 300a in FIG. 3). The shaft 630 may be configured to extend in a longitudinal direction of the electronic device 201 and include a cylindrical and/or prismatic shape in at least a partial area thereof. According to an embodiment, the nib 320 may include a stopper part 610 formed on an end of the shaft 630. According to an embodiment, the pen housing 300 may include a nib holder 620 disposed in the accommodation space 301. According to an embodiment, the nib holder 620 may provide an inner space formed in the center thereof and including a diameter greater than or equal to a predetermined length to allow the stopper part 610 to pass therethrough. According to an embodiment, the nib holder 620 may include a stopper protrusion 621, and the stopper protrusion 621 portion of the nib holder 620 may provide elastic force in a direction toward the inner space as the inner space is widened. According to an embodiment, the diameter of the inner space of the area in which the stopper protrusion 621 is disposed may be smaller than the diameter of the stopper part 610. According to an embodiment, the shaft 630 and the stopper part 610 may slide in the inner space provided in the nib holder 620 to move in the left direction (e.g., the −X-axis direction) or the right direction (e.g., the X-axis direction). According to an embodiment, the nib holder 620 may be in a state of being fixed to a partial area inside the pen housing 300. Therefore, only the shaft 630 and the stopper part 610 may integrally reciprocate. According to an embodiment, the nib 320 may include an auxiliary elastic member inside or outside the shaft 630. The auxiliary elastic member may be supported by the nib holder 620 to press the stopper part 610 in the X-axis direction.

Referring to FIG. 6, the auxiliary elastic member may press a stopper part 610 in an X-axis direction, and the stopper part 610 may be regulated by a stopper protrusion 621 to be fixed.

Referring to FIGS. 6 and 7, at least a part of the nib may protrude outside the pen housing 300. At least a part of the pen tip 321 may protrude outside the pen housing 300 via a second end (e.g., the second end 300b in FIG. 3). According to an embodiment, the pen tip 321 protruding to the outside may receive the pressure (e.g., the pen pressure) from the outside according to the writing input of a user. For example, the pressure direction may include at least force in an X-axis direction. According to an embodiment, the pressure (e.g., the pen pressure) in the X-axis direction, which is received by the pen tip 321, may be transmitted to the stopper part 610. The stopper part 610 may press the stopper protrusion 621 of the nib holder 620 to be widened, and the stopper protrusion 621 may be widened by the diameter of the stopper part 610 or more when exceeding the predetermined threshold pressure. The stopper part 610 may be moved in the X-axis direction by the elastic force of the auxiliary elastic member when the stopper protrusion 621 is widened and the regulation of the stopper protrusion 621 is released.

Referring to FIG. 7, as the nib 320 moves in the X-axis direction, the pen tip 321 may be inserted into the pen housing 300. According to an embodiment, the stopper protrusion 621 may include a structure or material having the elastic modulus which allows it to be widened by the diameter of the stopper part 610 or more when the pen pressure exceeds the pressure in a predetermined range. The pressure in the predetermined range may mean, for example, a range smaller than the pressure in a range in which a flexible display is not damaged. According to an embodiment, the electronic device 201 may include a button for returning the pen tip 321 inserted into the pen housing 300 to the outside of the pen housing 300. According to an embodiment, when the button is pressed, the stopper part 610 may be sequentially pressed to be moved in the −X-axis direction of the nib holder 620, and the pen tip 321 may return to the outside of the pen housing 300. According to an embodiment, the button may protrude through at least a part of the pen housing 300 when the pen tip 321 is inserted. For example, the button may protrude to the outside of the pen housing 300 through the first end (e.g., the first end 300a in FIG. 3) according to the insertion of the pen tip 321.

Figure 8:
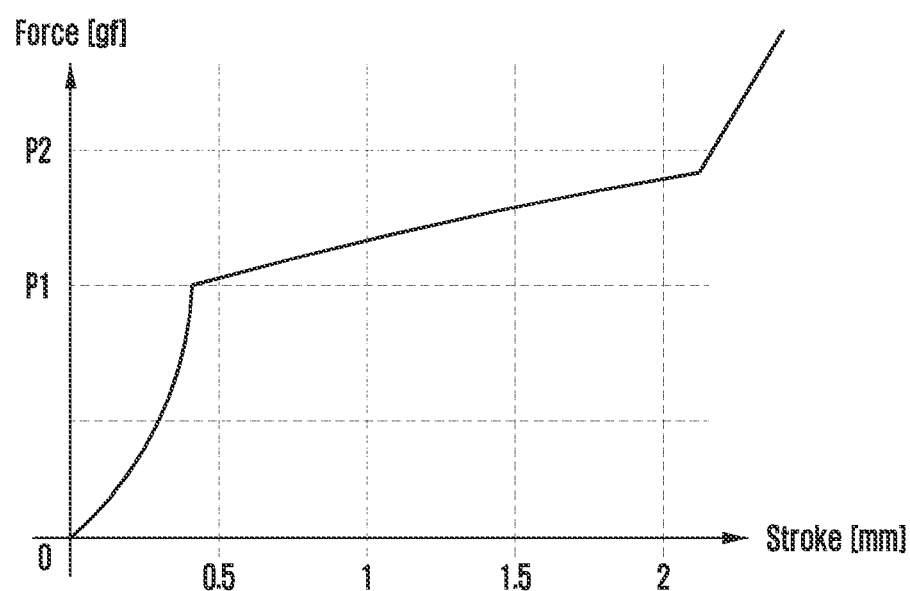
FIG. 8 illustrates a compression characteristic of an elastic member according to an embodiment of the disclosure.

FIG. 8 illustrates a compression characteristic of an elastic member (e.g., an elastic member in FIGS. 3, 4, and/or 5) according to an embodiment of the disclosure.

Referring to FIG. 8, it may show a curve illustrating a relationship between elastic force and a compressed length (stroke) of an elastic member 312. According to an embodiment, the elastic member 312 may be compressed by the pressure (e.g., the pen pressure). Referring to the curve in FIG. 8, the elastic member 312 may have a very small compressed-length until the pressure reaches a predetermined value (e.g., a first threshold value P1). In this case, it may be represented by a substantially uncompressed state. According to an embodiment, the elastic member 312 may start to be compressed when the pen pressure higher than or equal to the first threshold value P1 is transmitted. Referring to the curve in FIG. 8, when the pressure of the elastic member 312 exceeds a predetermined value (e.g., a second threshold value P2), the compression thereof may not substantially proceed. According to an embodiment, when the pen pressure transmitted to the elastic member 312 is higher than or equal to the second threshold value P2, the compression may not proceed any further. Referring to the curve in FIG. 8, the maximally compressed length of the elastic member 312 may be represented by a compressed length value (e.g., about 2 mm) corresponding to the second threshold value P2. The curve in FIG. 8 is an example of the elastic force curve of the elastic member 312, and specific numerical values may be changed or replaced. According to an embodiment, a pen tip (e.g., the pen tip 321 in FIG. 3) may protrude to the outside of a pen housing (e.g., the pen housing 300 in FIG. 3), and the length by which the pen tip 321 protrudes may be smaller than or equal to the maximally compressed length of the elastic member 312. According to an embodiment, when the elastic member 312 is maximally compressed, the pen tip 321 may be completely inserted into the pen housing 300. According to various embodiments, the elastic force at the maximally compressed length may need to be smaller than the damage pressure of the flexible display so that the flexible display is not damaged by the pen pressure and the pen tip 321. For example, when the damage pressure at which the flexible display starts to be damaged is 700 gf, P2 may be less than 700 gf.

Figure 9:
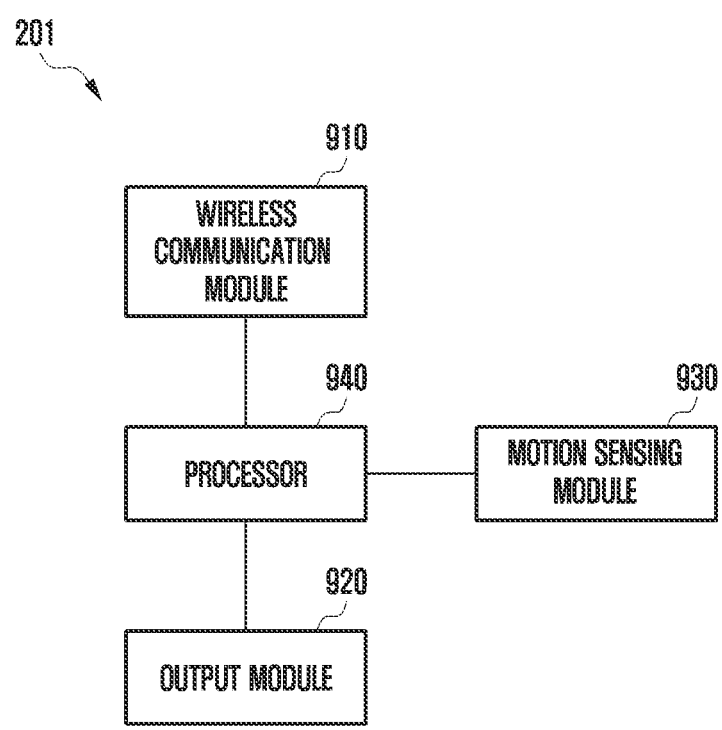
FIG. 9 is a block diagram of an electronic device according to an embodiment of the disclosure.

FIG. 9 is a block diagram of an electronic device according to an embodiment of the disclosure.

Referring to FIG. 9, an electronic device 201 (e.g., an electronic device 201 in FIG. 1) may include a processor 940, a wireless communication module 910, an output module 920, and/or a motion sensing module 930.

According to various embodiments, the wireless communication module 910 may be configured to perform a wireless communication function of the electronic device 201 and an external device (e.g., external devices 101 and 102 in FIG. 1). According to an embodiment, the wireless communication module 910 may transmit the status information and input information of the electronic device 201 to the external device 101 and 102 by using the near-field communication method. In an example, the near-field communication method may include at least one of Bluetooth, Bluetooth low energy (BLE), or a wireless LAN.

According to various embodiments, the motion sensing module 930 may sense a physical motion of the electronic device 201. The physical motion of the electronic device 201 may mean the motion of at least a part of the physical components of the electronic device 201 including a pen tip (e.g., the pen tip 321 in FIG. 3). According to an embodiment, a board seating part (e.g., the board seating part 333 in FIG. 3) and a nib (e.g., the nib 320 in FIG. 3) including the pen tip 321 may be connected to integrally reciprocate inside a pen housing (e.g., the pen housing 300 in FIG. 3), and the physical motion of the electronic device 201 may be understood as a distance by which the board seating part 333 and the nib 320 including the pen tip 321 have moved. According to various embodiments, the motion sensing module 930 may include one or more sensors. According to an embodiment, the motion sensing module 930 may use a sensor to sense a distance between the board seating part 333 and the elastic member seating part 311. According to an embodiment, the motion sensing module 930 may include a magnetic field sensor and a magnetic body. According to an embodiment, the motion sensing module 930 may include a physical switch (e.g., a tact switch or a C-clip type switch). According to an embodiment, the physical switch may generate an electric signal by physically contacting the board seating part 333 and the elastic member seating part 311 as they approach each other.

According to various embodiments, the output module 920 may output a signal to the outside of the electronic device 201. According to an embodiment, the output module 920 may include a motor, a piezoelectric element, or an electrical stimulation device and may output a haptic signal. According to an embodiment, the output module 920 may include a light-emitting element (e.g., light-emitting diode (LED)) and may output light which is a visual signal. According to an embodiment, the output module 920 may include a speaker which outputs a voice signal to the outside.

According to various embodiments, the processor 940 may be electrically connected to other components (e.g., the wireless communication module 910, the output module 920, and/or the motion sensing module 930) of the electronic device 201 to control same, and may perform various data processing or arithmetic operations. The types and/or amounts of the data processing, arithmetic operations, and operation which can be implemented by the processor 940 are not limited, but only the configuration and function of the processor 940 related to a method for limiting the pen pressure of the electronic device 201 and the operation of performing the method according to various embodiments will be described in the disclosure.

According to various embodiments, the processor 940 may sense a physical motion of the electronic device 201 by using the motion sensing module 930. The physical motion of the electronic device 201 may mean the motion of at least a part of the physical components of the electronic device 201 including a pen tip (e.g., the pen tip 321 in FIG. 3). According to an embodiment, a board seating part (e.g., the board seating part 333 in FIG. 3) and a nib (e.g., the nib 320 in FIG. 3) including the pen tip 321 may be connected to integrally reciprocate inside a pen housing (e.g., the pen housing 300 in FIG. 3), and the physical motion of the electronic device 201 may be understood as a distance by which the board seating part 333 and the nib 320 including the pen tip 321 have moved. According to various embodiments, the processor 940 may sense a distance between the board seating part 333 and the elastic member seating part 311 by using the motion sensing module 930. According to an embodiment, the motion sensing module 930 may include a magnetic field sensor and a magnetic body, and the magnetic field sensor and the magnetic body may be separately arranged in the board seating part 333 and/or the elastic member seating part 311, respectively. The processor 940 may sense a distance between the board seating part 333 and the elastic member seating part 311 by using the magnetic field sensor included in the motion sensing module 930. According to an embodiment, the motion sensing module 930 may include a physical switch, and the processor 940 may identify whether the board seating part 333 and the elastic member seating part 311 come into contact with each other by using the physical switch (e.g., a tact switch or a C-clip type switch). According to an embodiment, when an elastic member (e.g., the elastic member 312 in FIG. 3) is maximally compressed, the board seating part 333 and the elastic member seating part 311 may come into contact with each other or move to the point having the shortest distance therebetween, and come into contact with the physical switch. The processor 940 may receive an electric signal generated by the contacted physical switch and sense the distance between the board seating part and the elastic member seating part.

According to various embodiments, the processor 940 may identify whether it has exceeded the maximum pen pressure. The maximum pen pressure may be the greatest value among the pen pressures when the pen tip (e.g., the pen tip 321 in FIG. 3) is not completely inserted into the pen housing 300. The pen tip 321 may receive the pen pressure to transmit the pen pressure to the elastic member 312, and may be inserted into the pen housing 300 according to the compression of the elastic member 312 by the pen pressure. When the pen tip 321 is completely inserted into the pen housing 300, it may be understood that the elastic member 312 is in a state of being maximally compressed. For example, the maximum pen pressure may be understood as a pressure (e.g., the second threshold value P2 in FIG. 8) by which the elastic member 312 is maximally compressed. According to an embodiment, the processor 940 may determine whether it has exceeded the maximum pen pressure, based on the distance between the board seating part 333 and the elastic member seating part 311 sensed by the motion sensing module 930. According to an embodiment, the processor 940 may sense the pen pressure by using a pen pressure sensing unit (e.g., the pen pressure sensing unit 324 in FIG. 3) for obtaining the change in pressure due to the pressing of the pen tip 321 regardless of the motion sensing module 930.

According to various embodiments, the processor 940 may output a warning signal or transmit a notification signal to an external device (e.g., the external device 101 and 102 in FIG. 1). The processor 940 may output the warning signal by using the output module 920 when the pen pressure applied to the pen tip 321 exceeds the maximum pen pressure. According to an embodiment, the warning signal may include a voice signal, a haptic signal (e.g., vibration or touch), and/or a visual signal (e.g., a light source output). The warning signal may induce a user to reduce pen pressure or temporarily stop writing. According to an embodiment, the processor 940 may transmit the notification signal to an external device (e.g., external devices 101 and 102 in FIG. 1) by using the wireless communication module 910. According to an embodiment, the external devices 101 and 102 may output a warning message about the maximum pen pressure to a display (e.g., display 120, 140, and/or 150 in FIG. 1) or temporarily stop the writing input. According to an embodiment, the external device 101 and 102 may output a warning message on the display or stop the handwriting input to induce the user to limit the pen pressure.

Figure 10:
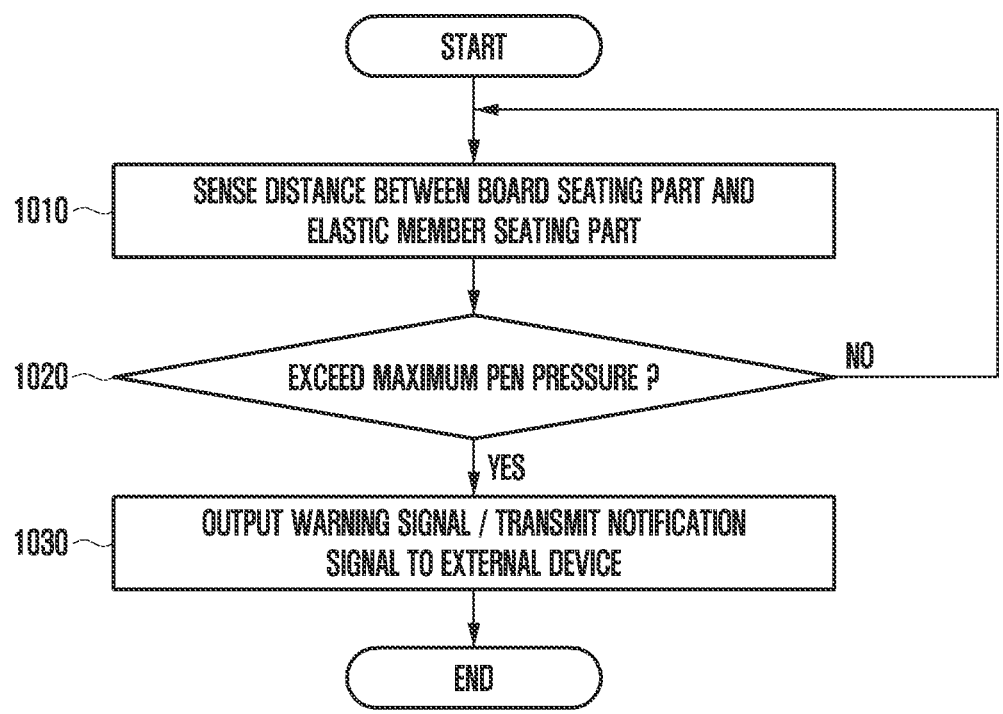
FIG. 10 is a flow chart illustrating operations in which an electronic device limits a pen pressure according to an embodiment of the disclosure.

FIG. 10 is a flow chart illustrating an operation in which an electronic device limits a pen pressure according to an embodiment of the disclosure.

Referring to FIG. 10, an operation of limiting a pen pressure by an electronic device may be understood as the operation performed by a processor (e.g., a processor 940 in FIG. 9) of an electronic device 201. Each operation in FIG. 10 may be reordered and some operations may be replaced, modified, and/or added.

Referring to operation 1010, the processor 940 may sense the distance between a board seating part (e.g., the board seating part 333 in FIG. 3) and an elastic member seating part (e.g., the elastic member seating part 311 in FIG. 3). According to various embodiments, the processor 940 may sense a physical motion of the electronic device 201 by using the motion sensing module 930. The physical motion of the electronic device 201 may mean the motion of at least a part of the physical components of the electronic device 201 including a pen tip (e.g., the pen tip 321 in FIG. 3). According to an embodiment, a board seating part (e.g., the board seating part 333 in FIG. 3) and a nib (e.g., the nib 320 in FIG. 3) including the pen tip 321 may be connected to integrally reciprocate inside a pen housing (e.g., the pen housing 300 in FIG. 3), and the physical motion of the electronic device 201 may be understood as a distance by which the board seating part 333 and the nib 320 including the pen tip 321 have moved. According to various embodiments, the processor 940 may sense a distance between the board seating part 333 and the elastic member seating part 311 by using the motion sensing module 930. According to an embodiment, the motion sensing module 930 may include a magnetic field sensor and a magnetic body, and the magnetic field sensor and the magnetic body may be separately arranged in the board seating part 333 and/or the elastic member seating part 311, respectively. The processor 940 may sense a distance between the board seating part 333 and the elastic member seating part 311 by using the magnetic field sensor included in the motion sensing module 930. According to an embodiment, the motion sensing module 930 may include a physical switch, and the processor 940 may identify whether the board seating part 333 and the elastic member seating part 311 come into contact with each other by using the physical switch (e.g., a tact switch or a C-clip type switch). According to an embodiment, when an elastic member (e.g., the elastic member 312 in FIG. 3) is maximally compressed, the board seating part 333 and the elastic member seating part 311 may come into contact with each other or move to the point having the shortest distance therebetween, and come into contact with the physical switch. The processor 940 may receive an electric signal generated by the contacted physical switch and sense the distance between the board seating part and the elastic member seating part.

Referring to operation 1020, the processor 940 may identify whether it has exceeded the maximum pen pressure. The maximum pen pressure may be the greatest value among the pen pressures when the pen tip (e.g., the pen tip 321 in FIG. 3) is not completely inserted into the pen housing 300. The pen tip 321 may receive the pen pressure to transmit the pen pressure to the elastic member 312, and may be inserted into the pen housing 300 according to the compression of the elastic member 312 by the pen pressure.

When the pen tip 321 is completely inserted into the pen housing 300, it may be understood that the elastic member 312 is in a state of being maximally compressed. For example, the maximum pen pressure may be understood as a pressure (e.g., the second threshold value P2 in FIG. 8) by which the elastic member 312 is maximally compressed. According to an embodiment, the processor 940 may determine whether it has exceeded the maximum pen pressure, based on the distance between the board seating part 333 and the elastic member seating part 311 sensed by the motion sensing module 930. According to an embodiment, the processor 940 may sense the pen pressure by using a pen pressure sensing unit (e.g., the pen pressure sensing unit 324 in FIG. 3) for obtaining the change in pressure due to the pressing of the pen tip 321 regardless of the motion sensing module 930.

Referring to operation 1030, the processor 940 may output a warning signal or transmit a notification signal to an external device (e.g., the external device 101 and 102 in FIG. 1). The processor 940 may output the warning signal by using the output module 920 when the pen pressure applied to the pen tip 321 exceeds the maximum pen pressure. According to an embodiment, the warning signal may include a voice signal, a haptic signal (e.g., vibration or touch), and/or a visual signal (e.g., a light source output). The warning signal may induce a user to reduce pen pressure or temporarily stop writing. According to an embodiment, the processor 940 may transmit the notification signal to an external device (e.g., external devices 101 and 102 in FIG. 1) by using the wireless communication module 910. According to an embodiment, the external device 101 and 102 may output a warning message about the maximum pen pressure to a display (e.g., display 120, 140, and/or 150 in FIG. 1) or temporarily stop the writing input. According to an embodiment, the external device 101 and 102 may output a warning message on the display or stop the handwriting input to induce the user to limit the pen pressure.

Figure 11:
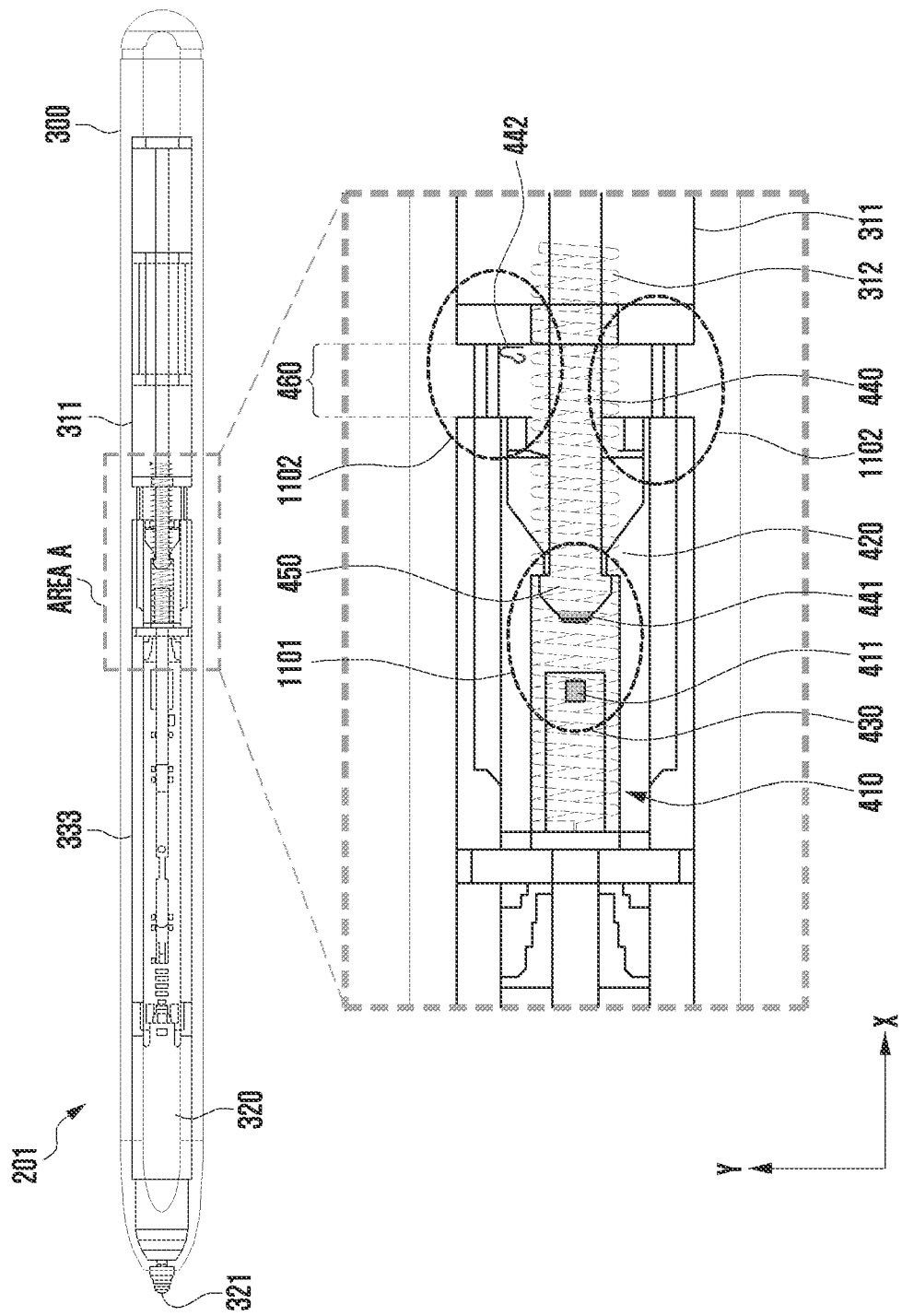
FIG. 11 illustrates a motion sensing module of an electronic device according to an embodiment of the disclosure.

FIG. 11 illustrates a motion sensing module of an electronic device according to an embodiment of the disclosure.

Referring to FIG. 11, an electronic device 201 may include a motion sensing module (e.g., a motion sensing module 930 in FIG. 9). According to various embodiments, the motion sensing module may include one or more elements (e.g., a first element 441, a second element 411, and/or a third element 442). According to various embodiments, at least one element (e.g., the first element 441, the second element 411, and/or the third element 442) included in the motion sensing module may be used to sense the distance between the board seating part 333 and the elastic member seating part 311. According to an embodiment, the first element 441 may be a tact switch. For example, the tact switch is a kind of a physical switch and may generate an electrical signal in response to physical contact with other objects. According to an embodiment, when the first element 441 is a tact switch, the board seating part 333 physically contacts the first element 441 when the elastic member 312 is maximally compressed, and the first element 441 may transmit an electric signal to a processor (e.g., the processor 940 in FIG. 9) according to the contact. According to an embodiment, the first element 441 may be a magnetic field sensor, and the second element 411 may be a magnetic body. According to an embodiment, when the first element 441 is a magnetic field sensor, the first element 441 may sense the change in the magnetic field due to the second element 411 which is a magnetic body according to the movement of the board seating part 333, and may sense the distance between the board seating part 333 and the elastic member seating part 311. According to an embodiment, the third element 442 may be a C-clip type switch. A C-clip type switch is a kind of a physical switch and may generate an electric signal by contact. The third element 442 may transmit an electric signal to the processor 940 when the board seating part 333 moves and is in contact therewith. According to various embodiments, the first element 441 and the second element 411 are separately mounted in at least a partial area of the board seating part 333 and at least a partial area of the elastic member seating part 311, respectively. According to an embodiment, when either one of the first element 441 and the second element 411 is seated on the board seating part 333, the other may be arranged at the corresponding position of the elastic member seating part 311. For example, the first element 441 and the second element 411 may be separately arranged in any one of a first area 1101 and a second area 1102, respectively. According to various embodiments, the third element 442 may be arranged in any one of at least a part of the board seating part 333 and at least a part of the elastic member seating part 311. For example, the third element 442 may be arranged in any one of the first area 1101 and the second area 1102.

An electronic device according to various embodiments disclosed herein may include a housing which includes a first end disposed on one end thereof and a second end disposed on the other end thereof opposite to the first end, a nib which is disposed in the housing, includes a pen tip protruding to the outside through the second end, and includes a dielectric coil wound multiple times therein, a printed circuit board electrically connected to the dielectric coil, a board seating part which is at least partially coupled to the nib and in which a printed circuit board is seated, an elastic member seating part disposed in the housing such that the elastic member seating part and the board seating part are at least partially fitted to each other, and an elastic member disposed between the elastic member seating part and the board seating part, wherein the nib, the board seating part, the elastic member, and the elastic member seating part are sequentially arranged in the housing, when the nib is pressed in a direction toward the inside of the housing by the pen pressure, the pen pressure is transmitted to the elastic member via the board seating part, the nib and the board seating part move in a first direction from the second end toward the first end as the elastic member is compressed by the pen pressure, and when the pressure is released, the nib and the board seating part are returned in a second direction opposite to the first direction by restoring force of the compressed elastic member.

The elastic member starts to be compressed from when the magnitude of the pen pressure is greater than or equal to a first threshold value, and is maximally compressed when the magnitude of the pen pressure has a second threshold value at least greater than the first threshold value, and when the elastic member is maximally compressed, the pen tip may be at least inserted into the housing.

The first threshold value may be greater than or equal to 300 gf, and the second threshold value may be smaller than 700 gf.

A nib regulation part disposed in the housing, configured to be widened due to the pressure greater than a predetermined pen pressure, and including a stopper protrusion may be further included, wherein the nib includes a stopper part, the stopper part is disposed to be regulated by the stopper protrusion of the nib regulation part, when the pen pressure is greater than the predetermined pen pressure, the stopper protrusion is widened so that the nib proceeds in the pen pressure direction, and when the nib is inserted thereinto, the stopper part is regulated by the stopper protrusion in a direction opposite to the pen pressure direction.

The electronic device may include a motion sensing module configured to sense the movement of the board seating part, an output module configured to output a signal to warn of exceeding the maximum pen pressure, and a processor disposed on the printed circuit board and operatively connected to the motion sensing module, wherein the processor is configured to sense whether the maximum pen pressure is exceeded via the motion sensing module and control, based on whether the maximum pen pressure is exceeded, the output module to output the signal.

The motion sensing module may include one of a tact switch or a magnetic sensor, the motion sensing module may be disposed between the board seating part and the elastic member seating part and sense a distance between the board seating part and the elastic member seating part, and the processor may determine, based on the distance, whether the maximum pen pressure is exceeded.

The electronic device may further include a wireless communication module, wherein the processor is configured to establish a near-field wireless communication connection with an external device via the wireless communication module, and when the pen pressure exceeds the maximum pen pressure, transmit a notification signal to the external device by using the near-field wireless communication.

The near-field wireless communication may be a Bluetooth low energy (BLE) communication.

The output module may include at least one of a speaker, a vibration motor, or a light bulb.

In a method for limiting a pen pressure of a user by a pen-type electronic device, the electronic device may include: a housing; a nib disposed in the housing and including a pen tip at least a part of which protrudes to the outside; a board seating part at least partially coupled to the nib; an elastic member seating part disposed such that the elastic member seating part and the board seating part are at least partially fitted to each other; and an elastic member disposed between the elastic member seating part and the board seating part, wherein when the nib is pressed in a direction toward the inside of the housing by the pen pressure, the board seating part is disposed to compress the elastic member while moving in a direction toward the elastic member seating part, and the method includes the operations of: sensing whether the maximum pen pressure is exceeded; and controlling, based on whether the maximum pen pressure is exceeded, the output module to output the signal.

The method may include the operations of sensing a distance between the board seating part and the elastic member seating part and determining, based on the distance, whether the maximum pen pressure is exceeded.

The method may include the operation of transmitting a notification signal to the external device by using a near-field wireless communication when the pen pressure exceeds the maximum pen pressure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a first end disposed on one end thereof; and a second end disposed on another end thereof opposite to the first end;

a nib disposed in the housing, the nib including a pen tip protruding to an outside through the second end and a dielectric coil wound multiple times therein;
a printed circuit board electrically connected to the dielectric coil;
a board seating part which is at least partially coupled to the nib and in which the printed circuit board is seated;
an elastic member seating part disposed in the housing such that the elastic member seating part and the board seating part are at least partially fitted to each other; and
an elastic member disposed between the elastic member seating part and the board seating part,
wherein the nib, the board seating part, the elastic member, and the elastic member seating part are sequentially arranged in the housing,
wherein, in response to the nib being pressed in a direction toward an inside of the housing by a pen pressure, the pen pressure is transmitted to the elastic member via the board seating part, and the nib and the board seating part move in a first direction from the second end toward the first end as the elastic member is compressed by the pen pressure, and
wherein in response to the pen pressure being released, the nib and the board seating part are returned in a second direction opposite to the first direction by restoring force of the compressed elastic member.

2. The electronic device of claim 1,
wherein the elastic member starts to be compressed in response to a magnitude of the pen pressure being greater than or equal to a first threshold value, and is maximally compressed in response to the magnitude of the pen pressure reaching a second threshold value greater than the first threshold value, and
wherein, in response to the elastic member being maximally compressed, the pen tip is at least partially inserted into the housing.

3. The electronic device of claim 2, wherein the first threshold value is greater than or equal to 300 gf, and the second threshold value is less than 700 gf.

4. The electronic device of claim 1, further comprising:
a nib regulation part disposed in the housing, the nib regulation part being configured to widen due to the pen pressure being greater than a predetermined pen pressure, the nib regulation part including a stopper protrusion,
wherein the nib includes a stopper part,
wherein the stopper part is disposed to be regulated by the stopper protrusion of the nib regulation part, and in response to the pen pressure being greater than the predetermined pen pressure, the stopper protrusion widens so that the nib moves in a pen pressure direction, and
wherein, in response to the nib being inserted in the nib regulation part, the stopper part is regulated by the stopper protrusion in a direction opposite to the pen pressure direction.

5. The electronic device of claim 1, comprising:
a motion sensing circuit configured to sense movement of the board seating part;
an output circuit configured to output a signal to warn of exceeding a maximum pen pressure; and
a processor disposed on the printed circuit board and operatively connected to the motion sensing circuit,
wherein the processor is configured to:
sense whether the maximum pen pressure is exceeded via the motion sensing circuit, and
control, based on whether the maximum pen pressure is exceeded, the output circuit to output the signal.

6. The electronic device of claim 5,
wherein the motion sensing circuit includes one of a tact switch or a magnetic sensor,
wherein the motion sensing circuit is disposed between the board seating part and the elastic member seating part and senses a distance between the board seating part and the elastic member seating part, and
wherein the processor is further configured to determine, based on the distance, whether the maximum pen pressure is exceeded.

7. The electronic device of claim 5, further comprising:
a wireless communication circuit,
wherein the processor is further configured to:
establish a near-field wireless communication connection with an external device via the wireless communication circuit, and
in response to the pen pressure exceeding the maximum pen pressure, transmit a notification signal to the external device by using the wireless communication circuit.

8. The electronic device of claim 7, wherein the near-field wireless communication connection is a Bluetooth low energy (BLE) communication.

9. The electronic device of claim 5, wherein the output circuit includes at least one of a speaker, a vibration motor, or a light.

10. A method for limiting a pen pressure of a user by a pen-type electronic device, the pen-type electronic device comprising:
a housing;
a nib disposed in the housing and including a pen tip, at least a partial area of the pen tip protruding to an outside;
a board seating part at least partially coupled to the nib;
an elastic member seating part disposed such that the elastic member seating part and the board seating part are at least partially fitted to each other; and
an elastic member disposed between the elastic member seating part and the board seating part,
wherein, in response to the nib being pressed in a direction toward an inside of the housing by the pen pressure, the board seating part is disposed to compress the elastic member while moving in a direction toward the elastic member seating part,
the method comprising:
sensing a distance between the board seating part and the elastic member seating part;
determining, based on the distance, whether a maximum pen pressure is exceeded, and
controlling, based on whether the maximum pen pressure is exceeded, an output circuit to output a signal.

11. The method of claim 10, comprising transmitting a notification signal to an external device by using near-field wireless communication in response to the pen pressure exceeding the maximum pen pressure.

* * * * *